No. 777,306. PATENTED DEC. 13, 1904.
C. J. RAWLINSON.
PHONOGRAPH, GRAPHOPHONE, &c.
APPLICATION FILED MAY 21, 1904.
NO MODEL. 2 SHEETS—SHEET 1.

Witnesses
Charles Septimus Berthon
Herbert D Jameson

Inventor
Clair James Rawlinson

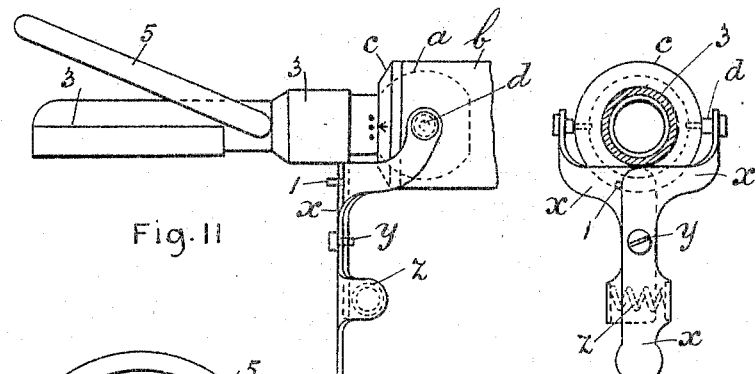
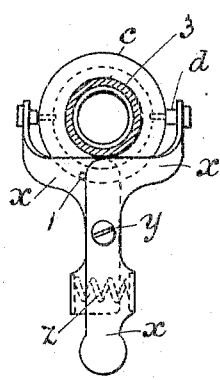
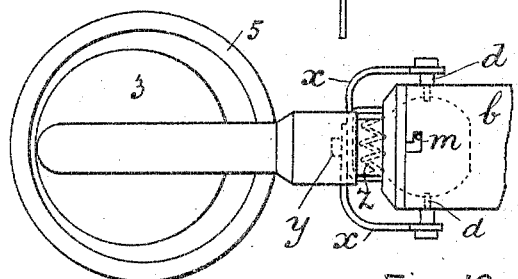
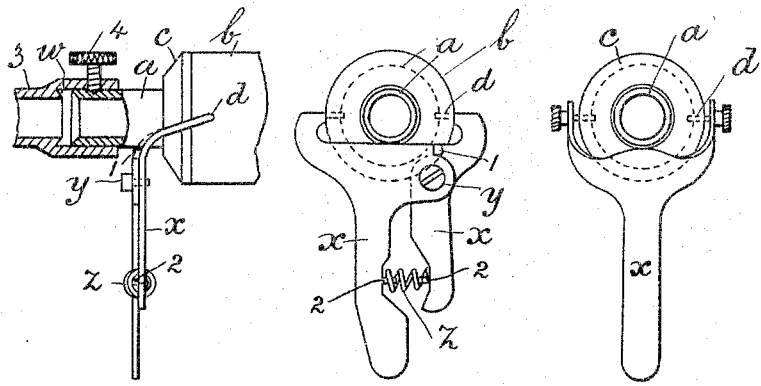

No. 777,306.

Patented December 13, 1904.

UNITED STATES PATENT OFFICE.

CLAIR JAMES RAWLINSON, OF LONDON, ENGLAND.

PHONOGRAPH, GRAPHOPHONE, &c.

SPECIFICATION forming part of Letters Patent No. 777,306, dated December 13, 1904.

Application filed May 21, 1904. Serial No. 209,080. (No model.)

*To all whom it may concern:*

Be it known that I, CLAIR JAMES RAWLINSON, engineer, a subject of the King of Great Britain, residing at London, England, have invented certain new and useful Improvements in and Relating to Phonographs, Graphophones, and Like Sound-Recording Instruments; and I do hereby declare the following to be a full, clear, and exact description of the invention, such as will enable others skilled in the art to which it appertains to make and use the same.

This invention relates to improvements in and connected with joints for forming flexible connection between the diaphragm and the trumpet in phonographs, graphophones, and other sound-recording or sound-producing instruments; and it consists of the construction, arrangement, and combination of parts hereinafter described, and particularly pointed out in the claims.

In order that my invention may be better understood, I will now describe the same with reference to the drawings, in which—

Figure 1:
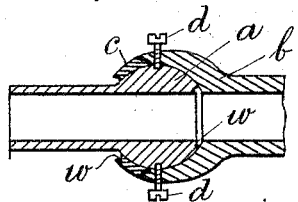
Figure 2:
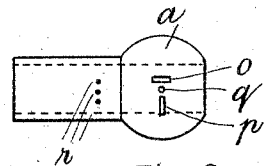
Figure 3:
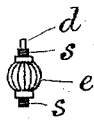
Figure 4:
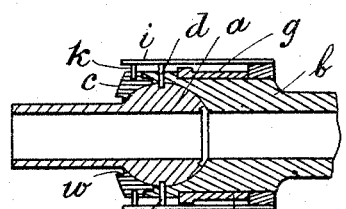
Figure 5:
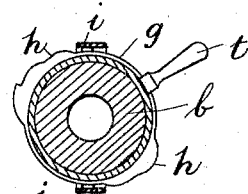
Figure 6:
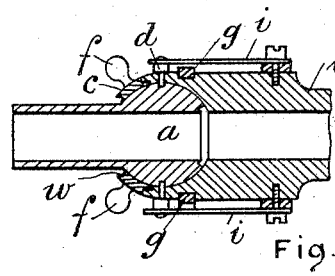
Figure 7:
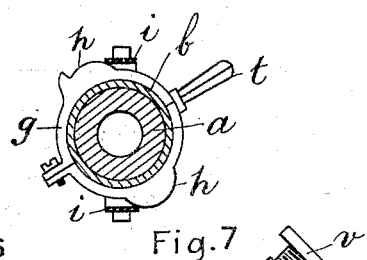
Figure 8:
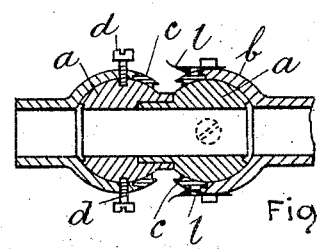
Figure 10:
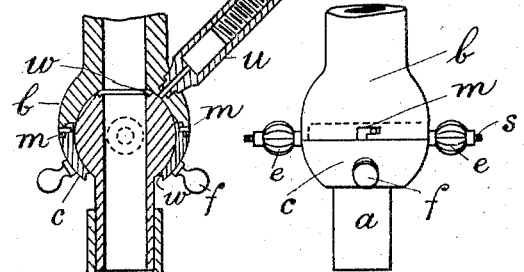
Figure 9:

Figure 1 is a longitudinal sectional view of one form of the invention. Fig. 2 is a view of the ball part of the joint. Fig. 3 is a view of one of the pivot-pins. Figs. 4 and 5 show a longitudinal section and a cross-section of a modification. Figs. 6 and 7 are like views of a further modification. Fig. 8 is a longitudinal sectional view of another modification. Fig. 9 is a section showing a lubricating arrangement. Fig. 10 is an elevation of Fig. 9. Fig. 11 is a side view showing the operating-lever and the weight 5. Fig. 12 is a plan thereof. Fig. 13 is a cross-section through the center of Fig. 11. Figs. 14, 15, and 16 are modified forms of levers.

The ball $a$ is inclosed in the cup or socket $b$ and is retained therein by means of the keep-ring $c$, which with the socket $b$ completes the ball-chamber. The keep-rings may be retained in position either by accuracy of fit, as in Fig. 1, by means of the spring-controlled keep-pins $k$, as in Fig. 4, may be screwed direct to the ball-chamber, as in Fig. 6, may be held in position by spring-clips $l$, as in Fig. 8, or by means of the bayonet-joint $m$, as shown in Figs. 9 and 10. The knobs $f$ are to facilitate the attaching or detaching of the said keep-ring. The movement of the ball within the socket is limited by the pivot-pins $d$, one of such pivot-pins being on each side of the socket, the pivot-pin points entering longitudinal or transverse slots or recesses $o$ and $p$, formed in the surface of the ball $a$, as shown in Fig. 2, such slots or recesses being respectively opposite one another, or if motion in one direction only is required—for example, when making records—the points of the pivot-pins are transferred to the plain holes $q$, or I may bore the plain hole $q$ in the bottom of one of the slots or recesses $o$ or $p$. The neck of the ball is provided with marks $r$ to indicate the position of the slots and plain holes. The pivot-pins may be formed as shown in Fig. 3, $d$ being the point, $e$ the milled body, and $s$ the screwed ends, one end only being provided with a point $d$. The plain end is screwed into the holes in socket when no pivot-pin point is required.

I may employ spring-controlled pivot-pins, as shown in Figs. 4 and 6. One end of the spring $i$ is fixed to the prolongation of the ball-chamber $b$. The opposite end of the spring, carrying the pivot-pin $d$, retains the same within the slot or hole in the ball-surface. The ball-chamber is provided with a rotatable cam-ring $g$, as in Figs. 4, 5, 6, and 7, having cams or projections $h$ thereon. By moving the handle $t$ the ring is rotated, the cams or projections $h$ forcing the springs $i$ $i$ apart, and thus withdraw the points of the pivot-pins clear of the slots or holes, enabling the ball to be shifted. The springs $i$ $i$ may also carry the keep-pins $k$ $k$ for retaining the keep-ring $c$ in position, (see Fig. 4,) and the rotatable cam-ring is provided with projections of various heights. By turning the handle $t$ so that the first projection comes into contact with the springs $i$ $i$ the pivot-pins are withdrawn. A further turn brings a higher projection into contact with the springs $i$ $i$, forcing them farther apart, withdrawing the keep-pins $k$ $k$.

In the modification shown in Fig. 8 a double ball is employed, one ball giving motion in one desired direction and the other ball giving motion in the other desired direction. The ball-casing $b$, Fig. 9, is provided with a lubricator or lubricant-reservoir $u$, closed by a screwed lid $v$. By screwing in this lid the lubricant is forced into the joint. The capillary ducts $w$ $w$ retain the lubricant within the joint by capillary attraction.

In order that the recorder or diaphragm may be lifted clear of the recording-cylinder or record, I employ the lifting-lever $x$, pivoted to the ball-casing by the pivot-pins $d$ $d$ and hanging freely therefrom, as shown in Figs. 11, 12, 13, 14, 15, and 16. The lever $x$ may be constructed as shown in Figs. 11, 12, and 13, wherein the hinged jaws suspended from the pivot-pins are made in separate pieces and are hinged together by means of the hinge-pin $y$. The lower portions of the lever are forced apart by the spiral or other spring $z$, thereby closing the upper jaws and thereby retaining the pins $d$ in engagement with the ball $a$. The jaw-stop 1 is to retain the jaws the requisite distance apart and at the same time to prevent pressure upon the pins $d$ $d$ and also to permit the lever $x$ to hang freely upon the pins $d$ $d$, or I may construct the lifting-lever $x$ in a modified form, as shown in Figs. 14 and 15. In this instance the pivot-pins $d$ $d$ are formed integral with the jaws of the lever, and the hinge-pin $y$ is not central, the short jaw being provided with a stop-pin 1, which engages the larger jaw, and thus controls the depth to which the pivot-pins $d$ $d$ can enter. The lower part of the lever is provided with the spring-stops 2 2, which prevent the pins $d$ $d$ from being withdrawn to a greater extent than desirable and retain the spring $z$ in position. When it is desired to change the pivot-pins from plain holes $q$ to either slots $o$ or $p$, the lever $x$ is gripped so as to compress spring $z$, causing the jaws to move outwardly, withdrawing the pivot-pins. The ball may now be turned till the indicating-mark $r$ comes opposite the arrow upon the keep-ring $c$. Upon relieving the spring $z$ of pressure such spring forces the pins $d$ $d$ into engagement with the slots. The change from slots to plain holes is accomplished in a similar manner. The lever $x$ may be formed in one piece, Fig. 16, dispensing with the hinge $y$, rendering the lever more adjustable to suit various machines by bending the lower portion thereof. The pins $d$ are screwed into the jaws of the lever. To change from slots to plain holes, or the converse, the pins $d$ are unscrewed sufficiently to permit the ball to be turned. The set-screw 4 is for securing the diaphragm 3 to the socket of the ball $a$, and a capillary cannelure $w$ retains the lubrication within the joint, as shown in Fig. 14. The weight upon the diaphragm is adjusted by the regulating-ring 5, Figs. 11 and 12, sprung onto the tube of the diaphragm 3. Weight is added by forcing the ring 5 over the diaphragm or may be decreased by turning the ring away from the diaphragm.

I claim—

1. A joint for a graphophone consisting of a portion having a ball-shaped end, having a number of slots and holes therein, a portion having a cup-shaped end forming a socket, a keep-ring connected to said cup-shaped portion and pins carried in said cup-shaped portion engaging with the holes and slots in the ball-shaped portion, said ball-shaped portion also carrying indicating-marks, substantially as described.

2. A joint for a graphophone consisting of a portion having a ball-shaped end and having a number of slots and holes therein, a portion having a cup-shaped end forming socket for said ball-shaped end, a keep-ring connected to the cup-shaped portion, oil-ducts therein, pins carried in said cup-shaped portion engaging with the slots in the ball-shaped portion, and a weight-regulating device, substantially as described.

3. A joint for a graphophone consisting of a ball and socket, pins carried by the socket portion, a keep-ring connected to the socket portion the ball portion having slots and holes therein in which the pins engage and having also indicating-marks thereon and a lifting-lever connected to said joint.

4. A joint for a graphophone consisting of a ball and socket, pins carried by the socket portion, a keep-ring connected to the socket portion the ball portion having slots and holes therein in which the pins engage and having also indicating-marks thereon and a hinged and spring-urged lifting-lever connected to said joint.

5. A joint for graphophones and the like consisting of ball and socket portions, a keep-ring on the socket portion having oil-ducts therein and reversible pivot-pins on said socket portion said ball portion having slots and holes therein in which the pivots engage.

6. A joint of the class described consisting of ball and socket portions, a keep-ring on said socket portion having oil-ducts therein, spring-urged pivot-pins on said socket portion, and a rotatable cam-ring for operating the same, said ball portion having slots and holes in which the pins are adapted to engage said ball portion also having indicating-marks thereon.

7. A joint of the class described, consisting of ball and socket portions, a keep-ring on said socket portion having oil-ducts therein, pins for holding said rings in place, springs connected to the socket portion, pivot-pins carried by said springs and a rotatable cam-ring operating the keep-ring, said ball portion having holes and slots therein in which the pivot-pins are adapted to engage and also having indicating-marks thereon.

In witness whereof I have hereunto set my hand in presence of two witnesses.

CLAIR JAMES RAWLINSON.

Witnesses:
CHARLES SEPTIMUS BERTHON,
HERBERT D. JAMESON.